US009741358B2

(12) United States Patent
Parikh et al.

(10) Patent No.: US 9,741,358 B2
(45) Date of Patent: *Aug. 22, 2017

(54) METHOD AND SYSTEM FOR INTERFERENCE SUPPRESSION USING BLIND SOURCE SEPARATION

(71) Applicant: Texas Instruments Incorporated, Dallas, TX (US)

(72) Inventors: Devangi N Parikh, Atlanta, GA (US); Muhammad Zubair Ikram, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/300,690

(22) Filed: Jun. 10, 2014

(65) Prior Publication Data
US 2014/0288926 A1    Sep. 25, 2014

Related U.S. Application Data

(63) Continuation of application No. 12/880,059, filed on Sep. 10, 2010, now Pat. No. 8,787,591.
(Continued)

(51) Int. Cl.
| | | |
|---|---|---|
| H04B 15/00 | (2006.01) | |
| G10L 21/0208 | (2013.01) | |
| G10L 21/0272 | (2013.01) | |
| H04M 1/60 | (2006.01) | |
| H04R 3/00 | (2006.01) | |

(52) U.S. Cl.
CPC ...... *G10L 21/0208* (2013.01); *G10L 21/0272* (2013.01); *H04M 1/60* (2013.01)

(58) Field of Classification Search
CPC ... G10L 21/0208; G10L 21/0272; H04M 1/60
USPC ... 381/92, 94.1, 94.7, 94.2, 94.3, 66, 83, 95, 381/96
See application file for complete search history.

(56) References Cited

U.S. PATENT DOCUMENTS

7,027,980 B2 *  4/2006  Ramabadran ........... G10L 19/06
                                                      704/216
7,474,691 B2 *  1/2009  Dunyak ............. H04B 1/71075
                                                      375/144
(Continued)

*Primary Examiner* — Xu Mei
*Assistant Examiner* — Ammar Hamid
(74) *Attorney, Agent, or Firm* — Gregory J. Albin; Charles A. Brill; Frank D. Cimino (57) ABSTRACT

A method of interference suppression is provided that includes receiving a first audio signal from a first audio capture device and a second audio signal from a second audio capture device wherein the first audio signal includes a first combination of desired audio content and interference and the second audio signal includes a second combination of the desired audio content and the interference, performing blind source separation using the first audio signal and the second audio signal to generate an output interference signal and an output audio signal including the desired audio content with the interference suppressed, estimating interference remaining in the output audio signal using the output interference signal, and subtracting the estimated interference from the output audio signal to generate a final output audio signal with the interference further suppressed.

16 Claims, 8 Drawing Sheets

Related U.S. Application Data

(60) Provisional application No. 61/241,672, filed on Sep. 11, 2009.

(56) References Cited

U.S. PATENT DOCUMENTS

| | | | |
|---|---|---|---|
| 8,090,111 B2* | 1/2012 | Aichner | G10L 21/0272 381/56 |
| 2010/0017205 A1* | 1/2010 | Visser | G10L 21/02 704/225 |
| 2010/0046770 A1* | 2/2010 | Chan | H04R 3/005 381/92 |

* cited by examiner

| TEST CASE | PRIMARY SPEAKER | SECONDARY/INTERFERING NOISE |
|---|---|---|
| S1 | FEMALE | SPEECH |
| S2 | FEMALE | TRAIN |
| S3 | FEMALE | PUB |
| S4 | MALE | CAR |
| S5 | FEMALE AND MALE WITH PAUSES | TRAIN STATION |
| S6 | FEMALE WITH PAUSES | PUB |
| S7 | MALE WITH PAUSES | TRAIN |
| S8 | FEMALE | DIFFUSED PUB NOISE |
| S9 | FEMALE | DIFFUSED PUB NOISE AND MALE SPEAKER |

| TEST CASE | SNR BEFORE BSS (dB) | SNR AFTER BSS (dB) | POST-PROC SNR (dB) | SNR IMPROVEMENT (dB) |
|---|---|---|---|---|
| S8 | 1.8 | 6.6 | 11.6 | 9.8 |
| S9 | 2.4 | 6.5 | 11.1 | 8.7 |

METHOD AND SYSTEM FOR INTERFERENCE SUPPRESSION USING BLIND SOURCE SEPARATION

CROSS-REFERENCE TO RELATED APPLICATIONS

This application is a Continuation of and claims priority to U.S. patent application Ser. No. 12/880,059 filed Sep. 10, 2010, which claims benefit of U.S. Provisional Patent Application Ser. No. 61/241,672, filed Sep. 11, 2009, both of which are incorporated herein by reference in their entirety.

BACKGROUND OF THE INVENTION

The expectations of cellular telephone users are increasing every day. High quality speech communication in the presence of interference (e.g., unwanted sounds from the environment in which the cellular telephone is being used) along with extended battery life are desired features in such telephones. The quality of speech transmission in cellular telephones can be improved through the provision of interference suppression prior to the uplink transmission. Known interference suppression techniques that operate on audio signals captured by a single microphone may be used but may provide limited quality improvement when a noisy audio signal has a very low signal-to-noise ratio (SNR). Moreover, some of these techniques are based on non-linear processing that may introduce musical noise artifacts into the interference suppressed signal, thus reducing speech intelligibility. Blind source separation (BSS) interference suppression techniques, e.g., principal components analysis, singular value decomposition, independent component analysis, dependent component analysis, and non-negative matrix factorization, are known in theory to improve speech quality in mobile environments in the presence of interference, but these techniques operate on audio signals captured by two or more microphones. Using multiple microphones and interference suppression based on BSS in a cellular telephone is challenging due to size and limited computational resources.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein.

In general, embodiments of the invention provide for interference suppression in an audio signal using blind source separation (BSS). More specifically, in embodiments of the invention, audio signals including desired content, e.g., speech, and undesired content, i.e., interference, are captured using two or more microphones and interference suppression is performed using a BSS technique on the captured signals from the two or more microphones to separate the desired content from the interference to produce an interference-suppressed output audio signal of the desired content. Interference may be any audio content in an audio signal other than the desired audio. For example, when a person is speaking on a cellular telephone, the audio signal includes that person's speech (the desired content) and other sounds from the environment around that person, e.g., road noise in a moving automobile, wind noise, one or more other people speaking, music, etc. that interfere with the speech. In one or more embodiments of the invention, the computational complexity of the BSS technique is reduced by approximating the computation of a tangent hyperbolic function used to separate the desired audio content and the interference with a predetermined lookup up table and interpolation between values in the lookup table. This reduction in computational complexity allows the BSS technique to execute in real-time, making it suitable for implementation in digital systems with limited computational resources such as cellular telephones.

In some embodiments of the invention, the output audio signal of the BSS is further processed to suppress interference from diffused noise that may still remain in the output audio signal. In such embodiments, the BSS technique also produces an output interference signal of the interference separated from the captured signals. The BSS post-processing uses this output interference signal to estimate the interference remaining in the output audio signal. The estimated interference is then removed from the BSS-generated output audio signal to produce a final interference-suppressed output audio signal. In some embodiments of the invention, a transform vector is computed for use in estimating the interference remaining in the output audio signal. The computation of the transform vector includes computing the pseudo inverse of a matrix of magnitude spectrum data. In some such embodiments, the computational complexity of the post-processing is reduced by replacing this complex pseudo inverse computation with a novel and simpler technique that results in the pseudo inverse matrix.

Figure 1:
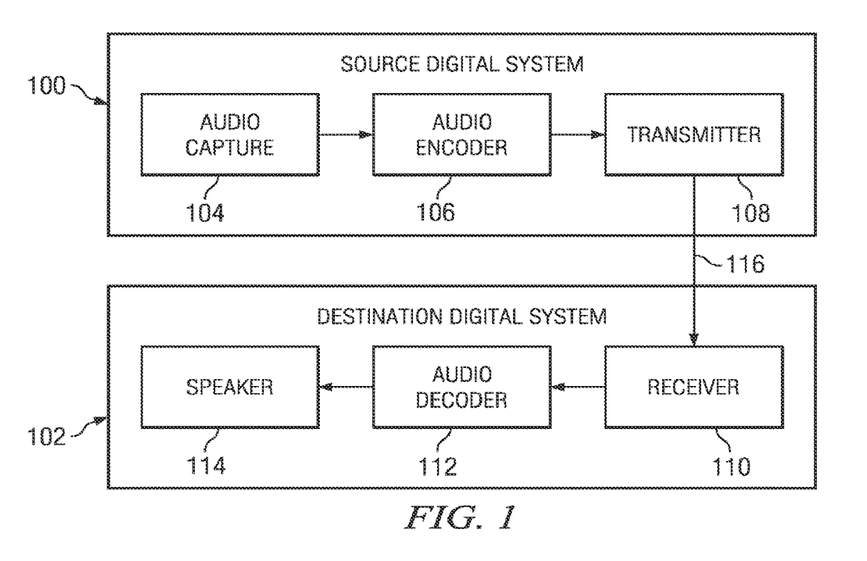
FIG. 1 shows a block diagram of a digital system in accordance with one or more embodiments of the invention.

FIG. 1 shows a block diagram of a system in accordance with one or more embodiments of the invention. The system includes a source digital system (100) that transmits encoded digital audio signals to a destination digital system (102) via a communication channel (116). The source digital system (100) includes an audio capture component (104), an audio encoder component (106), and a transmitter component (108). The audio capture component (104) includes functionality to capture two or more audio signals. In some embodiments of the invention, the audio capture component (104) also includes functionality to convert the captured audio signals to digital audio signals. The audio capture component (104) also includes functionality to provide the captured analog or digital audio signals to the audio encoder component (106) for further processing. The audio capture component (104) may include two or more audio capture devices, e.g., analog microphones, digital microphones, microphone arrays, etc. The audio capture devices may be arranged such that the captured audio signals each include a mixture of desired audio content, e.g., speech, and undesired audio content, e.g., interference.

The audio encoder component (106) includes functionality to receive the two or more audio signals from the audio capture component (104) and to process the audio signals for transmission by the transmitter component (108). In some embodiments of the invention, the processing includes converting analog audio signals to digital audio signals when the received audio signals are analog. The processing also includes encoding the digital audio signals for transmission in accordance with an encoding standard. The processing further includes performing a method for interference suppression using BSS in accordance with one or more of the embodiments described herein. More specifically, a method for interference suppression is performed that takes the two or more digital audio signals as input and produces a single digital audio signal of the desired content with the interference suppressed. This output audio signal is then encoded and provided to the transmitter component (108). In some embodiments of the invention, the audio encoder component (106) also includes functionality to convert the single digital audio signal to an analog audio signal prior to providing the signal to the audio capture component (108). The functionality of an embodiment of the audio encoder component (106) is described in more detail below in reference to FIG. 2.

The transmitter component (108) includes functionality to transmit the encoded audio data to the destination digital system (102) via the communication channel (116). The communication channel (116) may be any communication medium, or combination of communication media suitable for transmission of the encoded audio sequence, such as, for example, wired or wireless communication media, a local area network, and/or a wide area network.

The destination digital system (102) includes a receiver component (110), an audio decoder component (112) and a speaker component (114). The receiver component (110) includes functionality to receive the encoded audio data from the source digital system (100) via the communication channel (116) and to provide the encoded audio data to the audio decoder component (112) for decoding. In general, the audio decoder component (112) reverses the encoding process performed by the audio encoder component (106) to reconstruct the audio data. The reconstructed audio data may then be reproduced by the speaker component (114). The speaker component (114) may be any suitable audio reproduction device.

In some embodiments of the invention, the source digital system (100) may also include a receiver component and an audio decoder component, and a speaker component and/or the destination digital system (102) may include a transmitter component, an audio capture component, and an audio encoder component for transmission of audio sequences in both directions. Further, the audio encoder component (106) and the audio decoder component (112) may perform encoding and decoding in accordance with one or more audio compression standards. The audio encoder component (106) and the audio decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Software implementing all or part of the audio encoder and/or audio decoder may be stored in a memory, e.g., internal and/or external ROM and/or RAM, and executed by a suitable instruction execution system, e.g., a microprocessor or DSP. Analog-to-digital converters and digital-to-analog converters may provide coupling to the real world, modulators and demodulators (plus antennas for air interfaces) may provide coupling for transmission waveforms, and packetizers may be included to provide formats for transmission.

Figure 2:
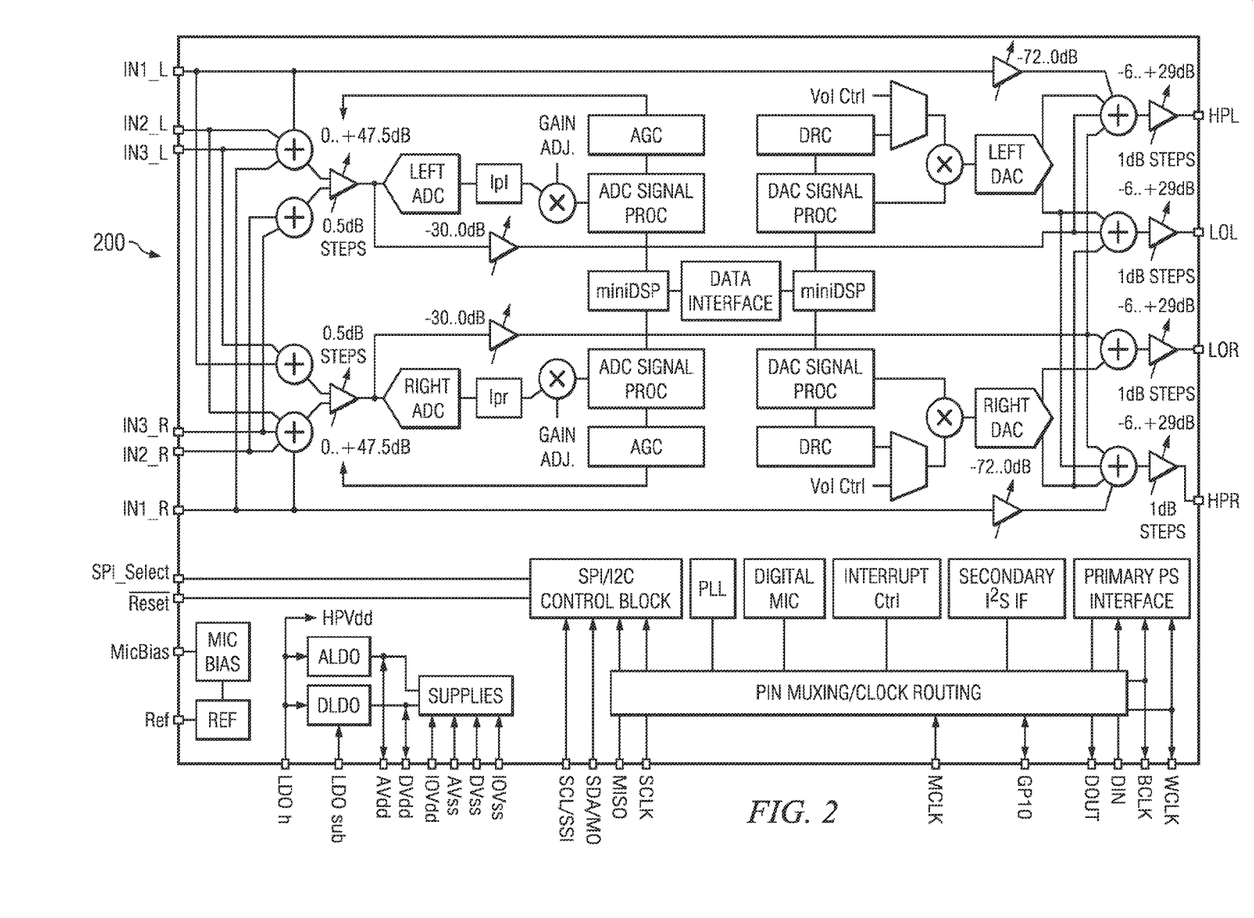
FIG. 2 shows a block diagram of an audio encoder in accordance with one or more embodiments of the invention.

FIG. 2 shows a block diagram of an audio encoder (200) (e.g., the audio encoder (106) of FIG. 1) in accordance with one or more embodiments of the invention. More specifically, FIG. 2 shows a simplified block diagram of a low power stereo audio codec available from Texas Instruments, Inc. This audio encoder is presented as an example of one audio encoder that may be configured to execute a method for interference suppression using BSS as described herein.

The audio encoder (200) include circuitry to accept inputs from two analog microphones and/or inputs from two digital microphones, ADC (analog-to-digital converter) circuitry for each analog input, and DAC (digital-to-analog converter) circuitry. The audio encoder (200) further includes a dual-core mini-DSP that may be used to perform interference cancellation techniques on the audio signals received from the digital and/or analog microphones as well as encoding audio signals. More specifically, the mini-DSP may be used to execute software implementing a method for interference suppression using BSS in accordance with one or more of the embodiments described herein. This software may be loaded into the device after power-up of a digital system incorporating the device. The functionality of the components of the audio encoder (200) will be apparent to one of ordinary skill in the art. Additional information regarding the functionality of this codec may be found in the product data sheet entitled "TLV320AIC3254, Ultra Low Power Stereo Audio Codec With Embedded miniDSP," available at http://focus.ti.com/lit/ds/symlink/tlv320aic3254.pdf. The data sheet is incorporated by reference herein.

Figure 3A:
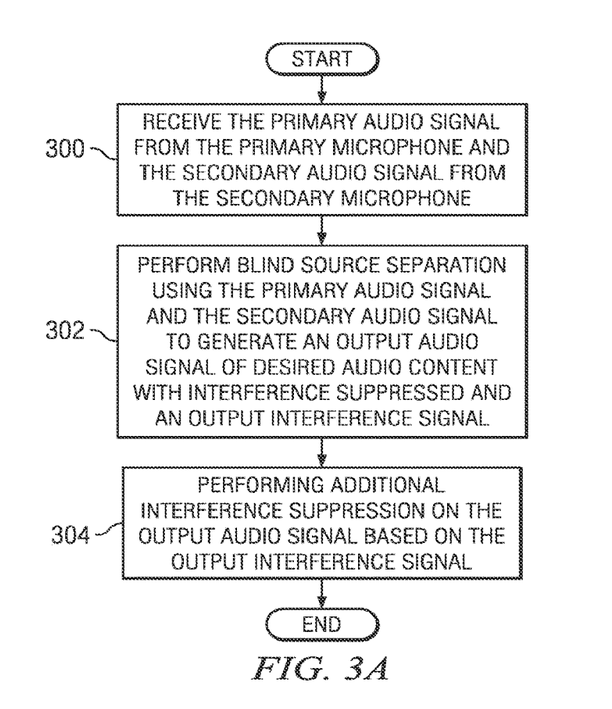
FIGS. 3A and 3B show flow diagrams of methods in accordance with one or more embodiments of the invention.
Figure 3B:
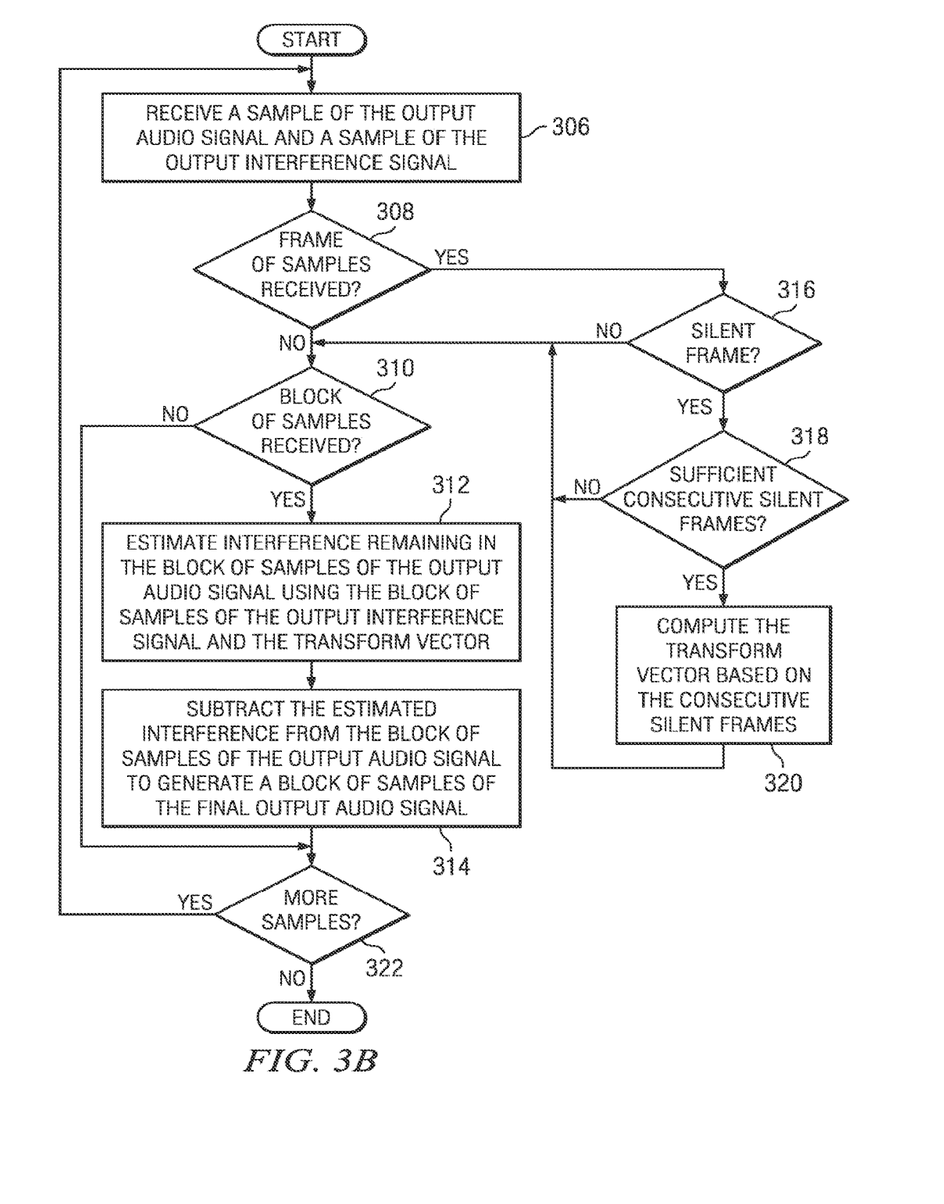

FIGS. 3A and 3B show a flow diagram a method for interference suppression using BSS in accordance with one or more embodiments of the invention. For simplicity of explanation, the method is described assuming audio inputs from two microphones. However, one of ordinary skill in the art will understand other embodiments in which more than two audio capture devices may be used.

As shown in FIG. 3A, initially, a primary audio signal is received from a primary microphone and a secondary audio signal is received from a secondary microphone (300). The primary microphone and the secondary microphone may be embodied in a digital system (e.g., a cellular telephone, a speakerphone, a computer system providing VoIP (Voice over Internet Protocol) communication, etc.) and are arranged to capture desired audio content, e.g., the speech of a person speaking, and any other sound in the environment where the desired audio content is generated, i.e., interference. Thus, the primary audio signal and the secondary audio signal are a mixture of an audio signal with the desired audio content and audio signals from other sounds in the environment. In one or more embodiments of the invention, the primary microphone and the secondary microphone are arranged so as to provide diversity between the primary audio signal and the secondary audio signal, with the primary microphone closest to the source of the desired audio content. For example, in a cellular telephone, the primary microphone may be the microphone positioned to capture the voice of the person using the cellular telephone and the secondary microphone may be a separate microphone located in the body of the cellular telephone.

A blind source separation (BSS) technique is performed using the primary audio signal and the secondary audio signal to generate an output audio signal of the desired audio content with the interference suppressed and an output interference signal of the interference (302). In general, BSS, also referred to as blind signal separation, is the separation of a set of signals from a set of mixed signals with little or no information about the source signals or the mixing process. BSS assumes that the source signals are not correlated, i.e., are mutually statistically independent. Thus, BSS separates a set of mixed signals into a set of signals such that the regularity of each separated signal is increased, and the regularity between the separated signals is decreased, i.e., statistical independence is maximized.

In embodiments of the invention, any suitable BSS technique may be used that can separate the input signals into the output audio signal and the output interference signal. In one or more embodiments of the invention, a stochastic gradient adaptive learning technique for BSS is used. The stochastic gradient adaptive learning technique for BSS is well known. A summary of the technique may be found in S. Haykin, "Unsupervised Adaptive Filtering, Volume 1: Blind Source Separation," John Wiley & Sons, Inc. 2000, pp. 20-23. In one application of this technique, the output audio signal and the output interference signal are separated from the input signals by minimizing the mutual information between the approximated cumulative density functions (CDF) of the separated signals, i.e., the output audio signal and the output interference signal. More specifically, the output signals are separated, i.e., unmixed, from the input signals through the application of finite impulse response (FIR) filters that are adapted based on minimization of mutual information between the approximated CDFs of the output signals. Note that because this BSS technique is based on adaptation of FIR filters, it may be suitable for use in audio codecs (e.g., the audio codec (200) of FIG. 2) in digital systems with limited computational resources (e.g., a cellular telephone) with implementation optimizations such as the one described below.

Figure 3C:
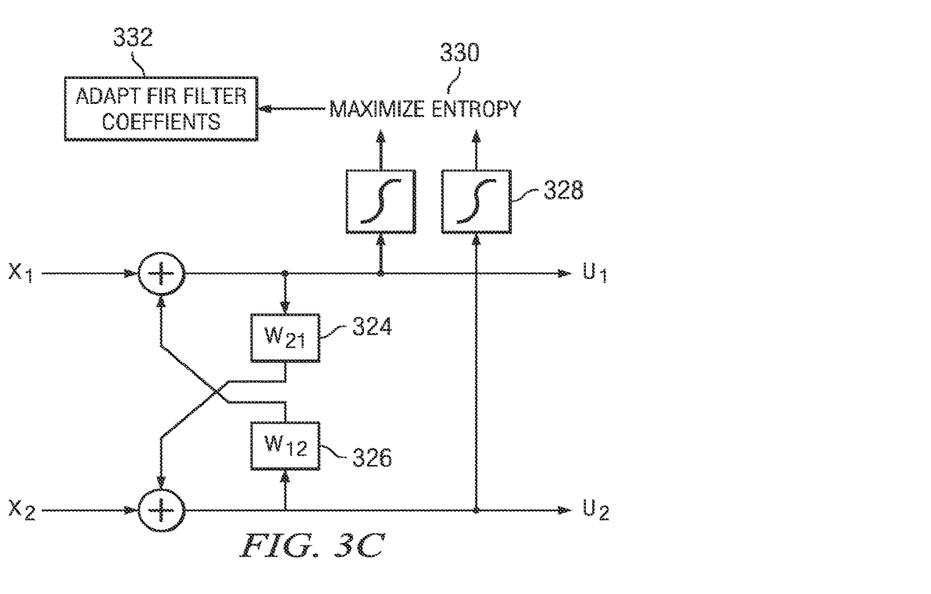
FIG. 3C shows a block diagram of blind source separation in accordance with one or more embodiments of the invention.

FIG. 3C shows a block diagram illustrating the flow of this BSS technique assuming two input audio signals, i.e., the primary audio signal and the secondary audio signal. In this figure, $x_1$ and $x_2$ are the input audio signals captured by the two microphones, $u_1$ and $u_2$ are the separated output signals, i.e., the output audio signal and the output interference signal, and $w_{21}$ and $w_{12}$ are FIR filters applied to separate $u_1$ and $u_2$ from the signal mixtures $x_1$ and $x_2$. In general, for i, j=1, 2, the separated output signals $u_1$ are obtained by applying the unmixing FIR filters $w_{ij}$ (324, 326) to the input audio signals $x_j$ as given by $$u_i(n) = x_i(n) + \Sigma_{k=0}^{P-1} w_{ij}(k) x_j(n-k), \quad (1)$$

where P is the length of the unmixing FIR filters $w_{ij}$ (324, 326) and n is the sample number. The length of the unmixing FIR filters (324, 326) may be any suitable length. In general, the length of the unmixing FIR filters may be selected based on environment acoustics. For example, if there are strong reflections of an audio signal from the walls and ceiling of a room, a higher value of P may be used. In one or more embodiments of the invention, FIR filters of length 128 are used.

As the samples of the separated output signals are generated, they are used to determine adaptations to the unmixing FIR filters (324, 326). As was previously mentioned, the unmixing FIR filters (324, 326) are adapted based on minimization of mutual information between the approximated CDFs of the output signals. The CDF is approximated by passing the separated output signals through a nonlinear function (328) as given by $$y_i(n) = g(u_i(n)), \quad (2)$$

where $g(\bullet)$ is the nonlinear function and $y_i$ is the output of the non-linear function when applied to the signal $u_i$. The function $g(\bullet)$ may be any suitable nonlinear function, e.g., $\tan h(\bullet)$, $(\bullet)^3$, etc.

In one or more embodiments of the invention, the non-linear function used is the hyperbolic tangent as given by $$y_i(n) = \tan h(u_i(n)). \quad (3)$$

In some such embodiments, to reduce computational complexity, the hyperbolic tangent function is implemented using a look-up table and interpolation between the values in the table using a $2^{nd}$ order Taylor series. As the tan h function is anti-symmetric about the y-axis and $\tan h(y) \in [-1,1]$, the look-up table may include fifty-nine (59) entries of tan h(x) for equi-spaced values of x in the interval $0 < x < \pi/2$.

The results of application of the nonlinear function to the samples of the separated output signals (328) are then used to maximize the entropy of the signal (330). More specifically, adaptations to the unmixing FIR filters are calculated based on a stochastic gradient rule. As was previously mentioned, the signals are separated by minimizing the mutual information between the CDFs of the separated signals. Minimizing the mutual information is equivalent to maximizing the entropy of the signal, which is given by $$H(y_i) = -E[\log(f_{y_i}(y_i))], \quad (4)$$

where $f_{y_i}(y_i)$ is the probability density function (PDF) of $y_i = \tan h(u_i)$. The PDF of the output can be written as $$f_{y_i}(y_i) = \frac{f_{x_i}(x_i)}{\det(J)}, \quad (5)$$

where J is the Jacobian of the unmixing FIR filters as given by $$J = \left[\frac{\partial y_i}{\partial x_j}\right]. \quad (6)$$

Thus, maximizing the entropy is equivalent to maximizing E[ log(det(P))]. A stochastic gradient rule can be derived from this such that the adaptations to the unmixing FIR filters (324, 326) may computed as $$\Delta w_{ij}(k) \propto \hat{y}_i u_j(n-k), \quad (7)$$

where $$\hat{y}_i = \frac{\partial}{\partial y_i}\left(\frac{\partial y_i}{\partial u_i}\right). \quad (8)$$

Once the adaptations are computed (330), the parameters of the unmixing FIR filters (324, 326) are changed based on these adaptations (332).

Referring again to FIG. 3A, after BSS is performed to generate the output audio signal and the output interference signal (302), additional interference suppression is performed on the output audio signal based on the output interference signal (304). That is, the output interference signal is used to estimate the interference remaining in the output audio signal. The estimated interference is then subtracted from the output audio signal to further suppress interference in the output audio signal, generating the final output audio signal. More specifically, in one or more embodiments of the invention, the magnitude spectrum $P_s$ in the final output audio signal S is estimated as given by $$P_s = P_x - P_y h, \quad (9)$$

where $P_x$ is the magnitude spectrum of the output audio signal X, $P_y$ is the magnitude spectrum of the output interference signal Y, and h is a transform vector of length L, i.e., a Wiener filter of length L, that maps the magnitude spectrum of the interference in the output interference signal Y to the magnitude spectrum of the interference in the output audio signal X. The value of L is may be any suitable value large enough to capture statistics of the desired audio content but not so large as to include time variation in the statistics, e.g., 64, 128, 256, 512, 1024, 2048, etc. In one or more embodiments of the invention, the value of L is the length of the Fourier transform used in the computation of the magnitude spectrums. In some embodiments of the invention, the value of L is 1024.

The frequency spectrum of the final output audio signal is then estimated using the magnitude spectrum $P_s$ and the unaltered phase of the frequency spectrum of the output audio signal X. In some embodiments of the invention, the frequency spectrum of the final output audio signal may be estimated by computing $P_s*\cos(\text{angle}(P_x))+\sqrt{-1}*P_s*\sin(\text{angle}(P_x))$. An inverse Fourier transform of the estimated frequency spectrum is then computed to obtain the final output audio signal.

The transform vector h may be estimated during silence intervals of sufficient length in the output audio signal and may be recomputed for each silence interval of sufficient length detected. That is, the transform vector h may be computed based on an initial silence interval of a predetermined length in the output audio signal, and then recomputed for each subsequent silence interval of the predetermined length in the output audio signal. A silence interval is a period in the output audio signal in which the desired audio content is not present. For example, if the desired audio content is speech, a silence interval is a period during which the speaker is not speaking. If the desired audio content is speech, a voice activity detector may be used to determine the silence intervals in the output audio signal. For other desired audio content, the silent intervals may be determined using any suitable technique.

The transform vector h may be computed as given by $$h = P_y^\dagger P_x, \quad (10)$$

where $(\bullet)^\dagger$ denotes pseudo inverse, and $P_x$ and $P_y$ are the magnitude spectrums of portions of the output audio signal and the output interference signal, respectively, corresponding to a silent interval. More specifically, the magnitude spectrum data in the output interference signal corresponding to the silent interval is given by $$P_y = \begin{bmatrix} \text{diag}[P_{y_n}(0)\ P_{y_n}(1)\ ...\ P_{y_n}(L-1)] \\ \text{diag}[P_{y_{n-1}}(0)\ P_{y_{n-1}}(1)\ ...\ P_{y_{n-1}}(L-1)] \\ \vdots \\ \text{diag}[P_{y_{n-N+1}}(0)\ P_{y_{n-N+1}}(1)\ ...\ P_{y_{n-N+1}}(L-1)] \end{bmatrix}, \quad (11)$$

where $P_{y_n}(k)$ denotes the kth frequency bin of the magnitude spectrum of the output interference signal for the nth frame of the signal and N is a number of frames in the silent interval. The value of N and the size of a frame, i.e., the number of samples in a frame, may be any suitable value and size selected such that the product of N and the frame size is less than or equal to the length L of the transform vector h. In some embodiments of the invention, N=3 and the frame size is 120 samples. The magnitude spectrum data in the output audio signal corresponding to the silent interval is given by $$P_x = \begin{bmatrix} [P_{x_n}(0)\ P_{x_n}(1)\ ...\ P_{x_n}(L-1)]^T \\ [P_{x_{n-1}}(0)\ P_{x_{n-1}}(1)\ ...\ P_{x_{n-1}}(L-1)]^T \\ \vdots \\ [P_{x_{n-N+1}}(0)\ P_{x_{n-N+1}}(1)\ ...\ P_{x_{n-N+1}}(L-1)]^T \end{bmatrix}, \quad (12)$$

where $P_{x_n}(k)$ denotes the kth frequency bin of the magnitude spectrum of the output audio signal for the nth frame of the signal, and $(\bullet)^T$ denotes transpose. Note that $P_y$ as defined in Eq. 11 is a NL×L matrix composed of N stacked diagonal matrices and $P_x$ as defined in Eq. 12 is a column vector of length NL.

Because $P_y$ is composed of stacked diagonal matrices, the pseudo inverse of $P_y$ may be given by $$P_y^\dagger = \begin{bmatrix} \sum_{i=0}^{N-1} \frac{1}{P_{y_{n-i}}^2(0)} & 0 & \cdots & 0 \\ \vdots & \sum_{i=0}^{N-1} \frac{1}{P_{y_{n-i}}^2(1)} & \ddots & \vdots \\ 0 & 0 & \cdots & \sum_{i=0}^{N-1} \frac{1}{P_{y_{n-i}}^2(L-1)} \end{bmatrix}. \quad (13)$$

FIG. 3B shows a flow diagram of a method for performing the additional interference suppression in the output audio signal (block 304 of FIG. 3A) in accordance with one or more embodiments of the invention. Initially, a sample of the output audio signal and the output interference signal are received from the BSS technique (306). A check is then made to determine if sufficient samples have been received from each signal to constitute a sample frame of each signal (308), i.e., an audio frame and an interference frame. If sufficient samples have been received, then the current audio frame is checked to determine if it is a silent frame, i.e., a frame in which the desired audio content is not present (316). Any suitable technique may be used to determine if the desired audio content is absent from the current audio frame. In some embodiments of the invention, if the desired audio content is speech, a voice activity detection (VAD) technique is used to detect silent frames in the output audio signal. Voice activity detection, which is also referred to as speech activity detection or speech detection, determines the presence or absence of human speech in audio signals which may also contain music, noise, or other sound.

In one or more embodiments of the invention, the received sample frames may overlap by some amount, e.g., 50%. For example, consider three consecutive frames, frame 1, frame 2, and frame 3 with a frame size of 120 samples and a 50% overlap. Frame 1 will be samples 0-119 of a signal, frame 2 will be samples 60-179, and frame 3 will be samples 120-239.

If the current audio frame is determined to be a silent frame (316), then a check is made to determine if sufficient consecutive silent frames N have been received to trigger computation of the transform vector h (318). The number of consecutive silent frames sufficient to trigger the computation may be any suitable number of frames. In some embodiments of the invention, the number of consecutive silent frames sufficient to trigger the computation is three frames, i.e., N=3, that overlap by 50%. Further, in some embodiments of the invention, once N consecutive silent frames are detected, and the computation is performed, if the next audio frame is also a silent frame, then the computation is triggered again. However, if the next audio frame is not a silent frame, then the N consecutive silent frames must again be detected before the computation is triggered. Consider an example of ten consecutive frames, F1-F10, where N=3 and F1-F5 are silent frames, F6 and F7 are not silent frames, and F8-F10 are silent frame. The computation will be triggered when F1-F3 are received. The computation will again be triggered when F4 is received based on the receipt of F2, F3, and F4. Similarly, the computation will again be triggered when F5 is received based on the receipt of F3, F4, and F5. Because F6 and F7 are not silent, computation will not be triggered when those frames are received. Further, computation will not be triggered when the silent frames F8 and F9 are received. However, when F10 is received, the computation will again be triggered based on the receipt of F8, F9, and F10.

If sufficient consecutive silent frames have been received (318), then the transform vector h is computed based on the consecutive silent frames (320). More specifically, the transform vector h is computed as per Eq. 10-Eq. 13 as previously described. That is, $P_x$ is computed as per Eq. 12, $P_y$ is computed as per Eq. 11, the pseudo inverse of $P_y$ is computed as per Eq. 13, and the transform vector h is computed as per Eq. 10. If the frame size is less than L, the frame data may be padded to length L for computing $P_x$ and $P_y$. For example, if N=3, L=1024, and n=10 (i.e., 10 frames have been received and frames 8, 9, 10 are silent frames), then $$P_x = \begin{bmatrix} [P_{x_{10}}(0) \ P_{x_{10}}(1) \ ... \ P_{x_{10}}(1023)]^T \\ [P_{x_9}(0) \ P_{x_9}(1) \ ... \ P_{x_9}(1023)]^T \\ [P_{x_8}(0) \ P_{x_8}(1) \ ... \ P_{x_8}(1023)]^T \end{bmatrix},$$

$$P_y = \begin{bmatrix} \text{diag}[P_{y_{10}}(0) \ P_{y_{10}}(1) \ ... \ P_{y_{10}}(1023)] \\ \text{diag}[P_{y_9}(0) \ P_{y_9}(1) \ ... \ P_{y_9}(1023)] \\ \text{diag}[P_{y_8}(0) \ P_{y_8}(1) \ ... \ P_8(1023)] \end{bmatrix},$$

and $$P_y^{\dagger} = \begin{bmatrix} \sum_{i=0}^{2} \frac{1}{P_{y_{10-i}}^2(0)} & 0 & 0 \\ 0 & \sum_{i=0}^{2} \frac{1}{P_{y_{10-i}}^2(1)} & 0 \\ 0 & 0 & \sum_{i=0}^{2} \frac{1}{P_{y_{10-i}}^2(1023)} \end{bmatrix}.$$

If a frame of samples has not been received (308), the current audio frame is not a silent frame (316), sufficient consecutive silent frames have not been received (318), or the transform vector has been computed (320), then a check is made to determine if sufficient samples have been received from each signal to constitute a sample block of length L of each signal, i.e., an audio block and an interference block (310). If sufficient samples have not been received, then processing continues with the next samples (306), if any (322). If an audio block and an interference block have been received, then the interference remaining in the audio block is estimated using the interference block and the transform vector h (312). The estimated interference is then subtracted from the audio block to generate a block of sample of the final output audio signal with interference further suppressed (314). More specifically, the magnitude spectrum of the audio block $P_x$ and the magnitude spectrum of the interference block $P_y$ are computed. The transform vector h is then applied to $P_y$ to estimate the interference remaining in the audio block, and the magnitude spectrum of a corresponding block of the final output signal $P_s$ is computed as per Eq. 9. The frequency spectrum of the corresponding final output block is then estimated using the magnitude spectrum $P_s$ and the unaltered phase of the frequency spectrum of the audio block. In some embodiments of the invention, the frequency spectrum of the final output audio block may be estimated by computing $P_s*\cos(\text{angle}(P_x))+\sqrt{-1}*P_s*\sin(\text{angle}(P_x))$. An inverse Fourier transform, which may be computed using an inverse fast Fourier transform, of the estimated frequency spectrum is then computed to obtain the final desired output audio block.

Referring again to FIG. 3A, in one or more embodiments of the invention, the additional interference suppression (304) may not be performed. As is explained below, use of the BSS alone provides sufficient interference suppression when interference from diffused noise is not present in the input signals. In some such embodiments, the blind source separation generates the output audio signal and does not generate the output interference signal. Further, in some embodiments of the invention, the additional interference suppression (304) may be conditionally performed. For example, a measure of the achieved interference suppression in the output audio signal may be computed, and if the achieved interference suppression is acceptable, the additional interference suppression is not performed. Otherwise, it is performed.

Figure 4:
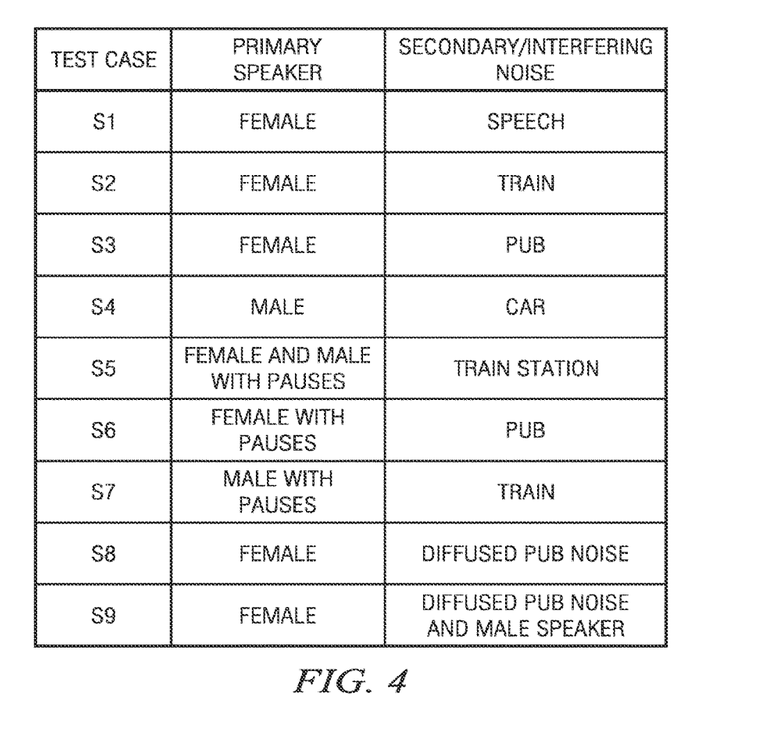
FIG. 4 shows a table of test cases in accordance with one or more embodiments of the invention.
Figure 5:
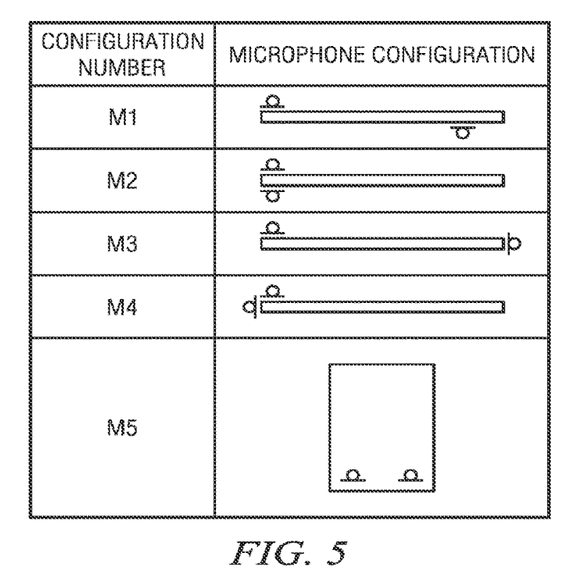
FIG. 5 shows a table of test configurations in accordance with one or more embodiments of the invention.

Embodiments of the invention were evaluated using a cellular telephone with two microphones and nine representative test cases with different combinations of speech and interference. These test cases are summarized in FIG. 4. The evaluations were conducted in a 12 ft. by 9 ft. 11 in. by 8 ft. 2 in. room. Two omni-directional microphones were mounted on the cellular telephone. One microphone was placed at the bottom front center of the cellular telephone in a typical location of a microphone for capturing the voice of a user. This microphone served as the primary microphone. The other microphone served as the secondary microphone, and was placed at different locations along the back and side of the cellular telephone in five different test scenarios. FIG. 5 illustrates the placement of the two microphones for each of the five test scenarios. The user of the cellular telephone was simulated by a primary loudspeaker placed near the primary microphone and the source of the interference was simulated by an interference loudspeaker placed at different locations in the room. Evaluations with diffused noise were conducted in a 10 ft. 2 in. by 12 ft. 3 in. by 10 ft. room in which the diffused noise was simulated by placing an interfering loudspeaker in a corner of the room facing the walls. Speech was played on the primary loudspeaker and noise and/or speech from an interfering source was played on the secondary loudspeaker. The mixed signals from the two microphones were captured using an acquisition board and stored on a computer and processed on the computer. That is, embodiments of methods for interference suppression as described herein were implemented on the computer and executed there.

An SNR (signal-to-noise ratio) measure was used to evaluate the performance of the method embodiments with various test cases and test scenarios. The SNR measure was calculated by determining the noise energy in the silence intervals of the speech. The locations of the silence intervals were determined from the clean speech played on the primary loudspeaker.

Figure 6:
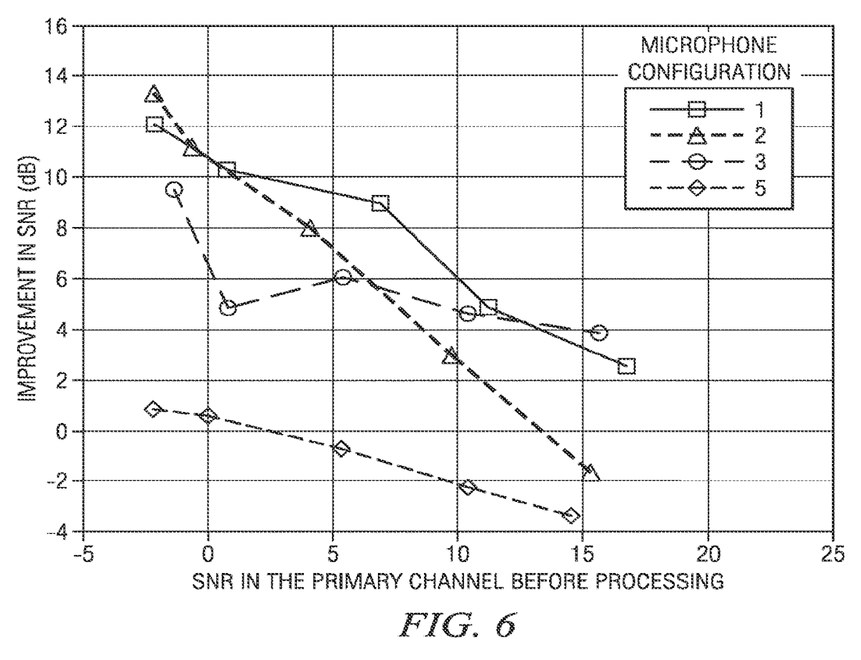
FIGS. 6-10 show test results in accordance with one or more embodiments of the invention.
Figure 7:
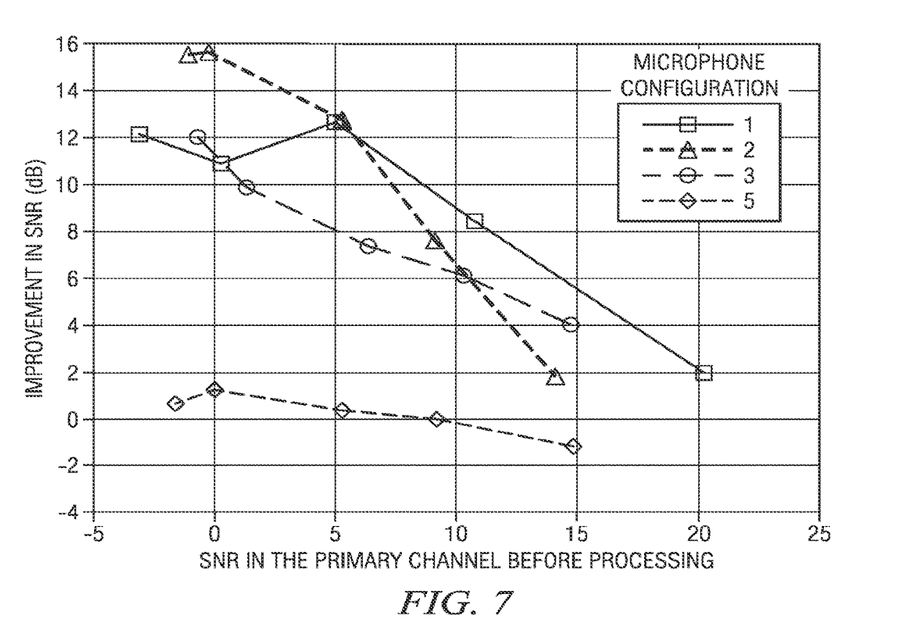

In one set of evaluations, the implemented method embodiment was the BSS processing without the post-processing to remove additional interference. This embodiment included the use of the look-up table for the tan h computation as previously described. The length of the unmixing FIR filters was 128. These evaluations used the first seven test cases of FIG. 4, S1-S7, with the five different microphone configurations of FIG. 5. An SNR measure was calculated before BSS processing, and subtracted from an SNR measure calculated after BSS processing to evaluate the performance improvement. The microphone configuration M4 of FIG. 5 (secondary microphone positioned at the bottom of the cellular telephone) was eliminated early in the evaluation process because of its relative poor performance. For the four other microphone configurations, recordings were made at five different primary input SNR level of 15 dB, 10 dB, 5 dB, 0 db, and <0 dB. Graphs of the results from test cases S6 and S7 are shown in FIG. 6 and FIG. 7, respectively. These graphs show that microphone configuration M1 (secondary microphone at the top of the back of the cellular telephone) resulted in the overall best performance. Note also that the SNR gain improved at low input SNR, which is desirable in cellular telephone applications.

Figure 8:
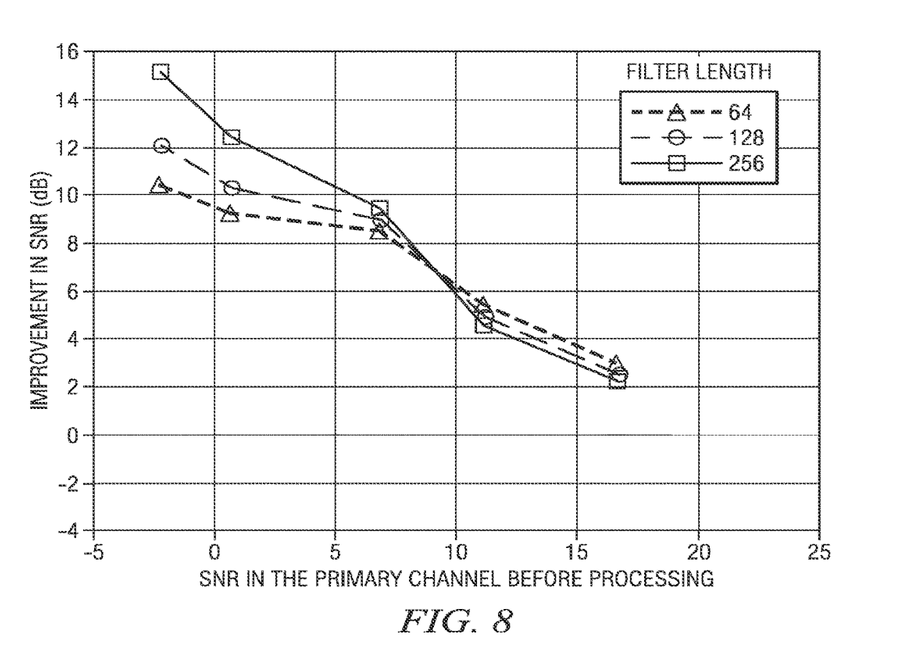

The interference suppression performance was also evaluated using different unmixing filter lengths. FIG. 8 shows a graph of the results of using microphone configuration M1 with three different filter lengths, 64, 128, and 256 for test case S6. This graph shows that for high input SNR, the output SNR is somewhat the same for all three filter lengths. However, for low input SNR, the performance improves with increasing filter length. Processing complexity also increases with filter length. Accordingly, an unmixing filter length of 128 may be used to trade off between computational complexity and increased interference suppression.

Figure 9:
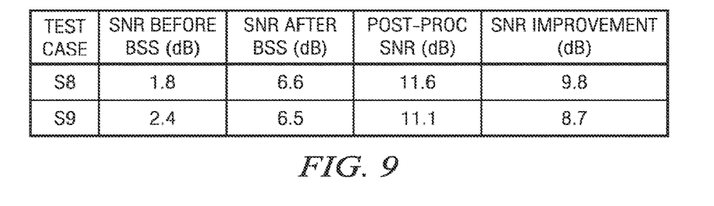
Figure 10:
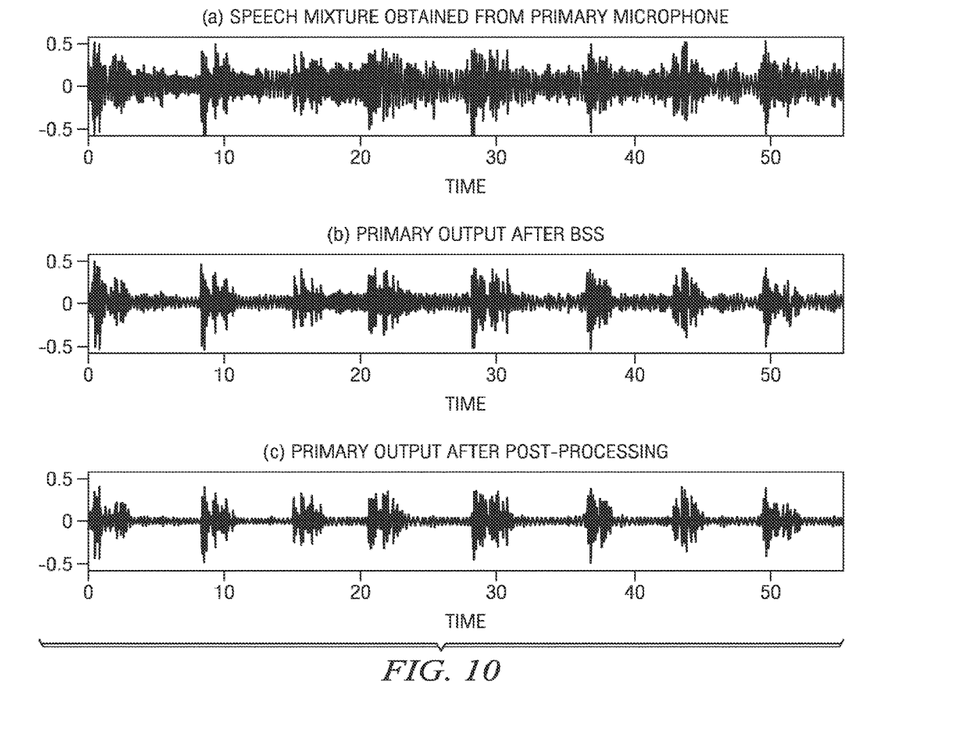

The performance of this embodiment was also evaluated with the presence of diffused interference using test cases S8 and S9. These results showed that the diffused interference was not as good as the point interference suppression. Accordingly, another embodiment of the method was evaluated in which both BSS processing and the post-processing were performed. For this embodiment, in the post-processing, N=3 and L=1024. This embodiment was evaluated using test cases S8 and S9. An SNR measure was calculated before BSS processing, after BSS processing, and after post-processing to evaluate the overall performance improvement. The SNR measures for these two test cases using microphone configuration M1 are shown in FIG. 9. As can be seen from FIG. 9, the SNR gains after BSS processing are significantly lower than the gains obtained for the test cases without diffused interference. However, the post-processing increases the gain (SNR Improvement column) to 9.8 dB and 8.7 dB for the two test cases. FIG. 10 shows the time domain plots of the mixed signal from the primary microphone, the separated output audio signal (primary output) after BSS, and the interference-suppressed signal obtained after post-processing for test case S8.

Embodiments of the methods for interference suppression and audio encoders described herein may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). Any included software may be initially stored in a computer-readable medium such as a compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Further, embodiments of the methods for interference suppression and audio encoders described herein may be implemented for virtually any type of digital system with functionality to capture at least two audio signals (e.g., a desk top computer, a laptop computer, a handheld device such as a mobile (i.e., cellular) telephone, a personal digital assistant, a Voice over Internet Protocol (VOIP) communication device such as a telephone, server or personal computer, a speakerphone, etc.).

Figure 11:
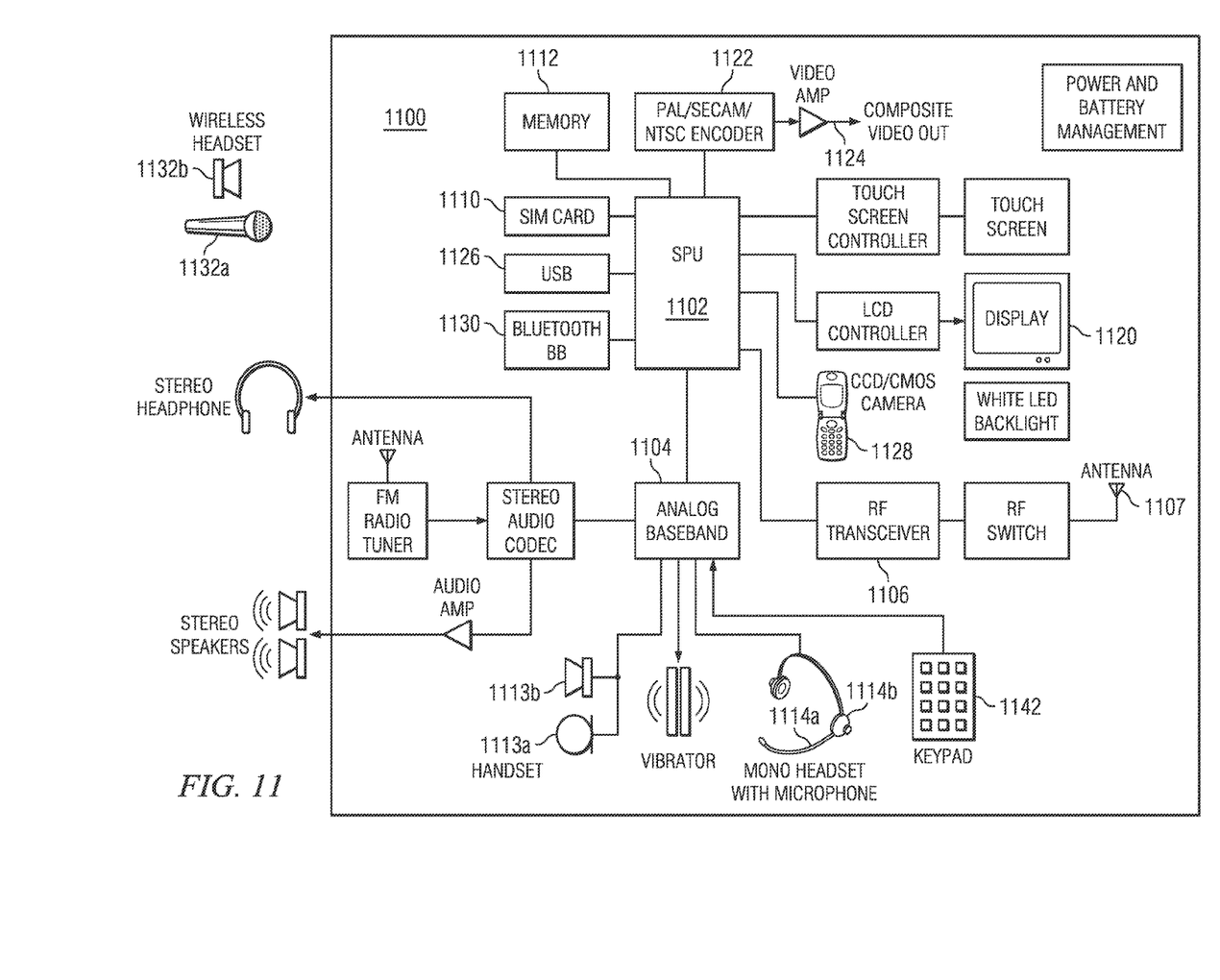
FIG. 11 shows an illustrative digital system in accordance with one or more embodiments of the invention.

FIG. 11 is a block diagram of an example digital system (e.g., a mobile cellular telephone) (1100) that may be configured to perform methods described herein. The digital baseband unit (1102) includes a digital signal processing system (DSP) that includes embedded memory and security features. The analog baseband unit (1104) receives input audio signals from one or more handset microphones (1113*a*) and sends received audio signals to the handset mono speaker (1113*b*). The analog baseband unit (1104) receives input audio signals from one or more microphones (1114*a*) located in a mono headset coupled to the cellular telephone and sends a received audio signal to the mono headset (1114*b*). The digital baseband unit (1102) receives input audio signals from one or more microphones (1132*a*) of the wireless headset and sends a received audio signal to the speaker (1132*b*) of the wireless head set. The analog baseband unit (1104) and the digital baseband unit (1102) may be separate ICs. In many embodiments, the analog baseband unit (1104) does not embed a programmable processor core, but performs processing based on configuration of audio paths, filters, gains, etc being setup by software running on the digital baseband unit (1102).

The display (1120) may also display pictures and video streams received from the network, from a local camera (1128), or from other sources such as the USB (1126) or the memory (1112). The digital baseband unit (1102) may also send a video stream to the display (1120) that is received from various sources such as the cellular network via the RF transceiver (1106) or the camera (1126). The digital baseband unit (1102) may also send a video stream to an external video display unit via the encoder unit (1122) over a composite output terminal (1124). The encoder unit (1122) may provide encoding according to PAL/SECAM/NTSC video standards.

The digital baseband unit (1102) includes functionality to perform the computational operations required for audio encoding and decoding. In one or more embodiments of the invention, the digital baseband unit (1102) is configured to perform computational operations of a method for interference suppression as described herein as part of audio encoding. Two or more input audio inputs may be captured by a configuration of the various available microphones, and these audio inputs may be processed by the method to generate an output audio signal of the speech of the speaker with interference suppressed. For example, two microphones in the handset may be arranged as previously described to capture a primary audio signal and a secondary audio signal. In another example, a microphone in a headset may be used to capture the primary audio signal and one or more microphones located in the handset may be used to capture secondary audio signals. Software instructions implementing the method may be stored in the memory (1112) and executed by the digital baseband unit (1102) as part of capturing and/or encoding of audio signals captured by the microphone configuration in use.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A digital system comprising:
    a primary microphone configured to capture a primary audio signal comprising a first combination of desired audio content and interference;
    a secondary microphone configured to capture a secondary audio signal comprising a second combination of the desired audio content and the interference; and
    an audio encoder operatively connected to the primary microphone and the secondary microphone to receive the primary audio signal and the secondary audio signal, wherein the audio encoder is configured to generate a final output audio signal comprising the desired audio content with the interference suppressed by:
        performing blind source separation using the primary audio signal and the secondary audio signal to generate an output interference signal and an output audio signal comprising the desired audio content with the interference suppressed, wherein the blind source separation uses a tangent hyperbolic function to separate the desired audio content and the interference;
        estimating interference remaining in the output audio signal using the output interference signal; and
        subtracting the estimated interference from the output audio signal to generate the final output audio signal.

2. The digital system of claim 1, wherein the digital system is a cellular telephone and the desired audio content is speech.

3. The digital system of claim 2, wherein the primary microphone is located on a lower front portion of the cellular telephone and the secondary microphone is located on an upper back portion of the cellular telephone.

4. The digital system of claim 1, wherein subtracting the estimated interference comprises:
    estimating a magnitude spectrum of a block of the final output audio signal based on the estimated interference;
    estimating a frequency spectrum of the block of the final output audio signal using the estimated magnitude spectrum and a phase of a frequency spectrum of a corresponding block of the output audio signal; and
    computing an inverse Fourier transform of the estimated frequency spectrum to generate the block of the final output audio signal.

5. The digital system of claim 1, wherein the desired audio content is speech.

6. The digital system of claim 1, wherein estimating the interference includes applying a transform vector to the output interference signal that maps a magnitude spectrum of the interference in the output interference signal to a magnitude spectrum of the interference in the output audio signal.

7. The digital system of claim 1, wherein estimating the interference includes:
    detecting a silence interval of a predetermined length in the output audio signal;
    computing a transform vector as a product of a matrix comprising a magnitude spectrum of the silence interval and a pseudo inverse of a matrix comprising a magnitude spectrum of a corresponding interval in the output interference signal; and
    applying the transform vector to a block of the output interference signal.

8. The digital system of claim 1, wherein the tangent hyperbolic function is approximated using a lookup table and interpolation between values in the lookup table.

9. A device comprising one or more processors configured to:
    perform blind source separation using a primary audio signal captured by a primary microphone and a secondary audio signal captured by a secondary microphone to generate an output interference signal and an output audio signal including desired audio content with interference suppressed, wherein the blind source separation uses a tangent hyperbolic function to separate the desired audio content and the interference;

estimate interference remaining in the output audio signal using the output interference signal; and subtract the estimated interference from the output audio signal to generate the final output audio signal.

10. The device of claim 9, wherein the device is a cellular telephone and the desired audio content is speech.

11. The device of claim 10, wherein the cellular telephone includes the primary microphone and the secondary microphone, wherein the primary microphone is located on a lower front portion of the cellular telephone, and the secondary microphone is located on an upper back portion of the cellular telephone.

12. The device of claim 9, wherein the one or more processors are further configured to:

estimate a magnitude spectrum of a block of the final output audio signal based on the estimated interference;

estimate a frequency spectrum of the block of the final output audio signal using the estimated magnitude spectrum and a phase of a frequency spectrum of a corresponding block of the output audio signal; and compute an inverse Fourier transform of the estimated frequency spectrum to generate the block of the final output audio signal.

13. The device of claim 9, wherein the desired audio content is speech.

14. The device of claim 9, wherein the one or more processors are further configured to apply a transform vector to the output interference signal that maps a magnitude spectrum of the interference in the output interference signal to a magnitude spectrum of the interference in the output audio signal.

15. The device of claim 9, wherein the one or more processors are further configured to:

detect a silence interval of a predetermined length in the output audio signal;

compute a transform vector as a product of a matrix comprising a magnitude spectrum of the silence interval and a pseudo inverse of a matrix comprising a magnitude spectrum of a corresponding interval in the output interference signal; and apply the transform vector to a block of the output interference signal.

16. The device of claim 9, wherein the tangent hyperbolic function is approximated using a lookup table and interpolation between values in the lookup table.

* * * * *